United States Patent [19]
Lee

[11] Patent Number: 4,870,745
[45] Date of Patent: Oct. 3, 1989

[54] METHODS OF MAKING SILICON-BASED SENSORS

[75] Inventor: Ki W. Lee, Williamsburg, Va.

[73] Assignee: Siemens-Bendix Automotive Electronics L.P., Troy, Mich.

[21] Appl. No.: 137,219

[22] Filed: Dec. 23, 1987

[51] Int. Cl.$^4$ .............................................. H01C 17/02
[52] U.S. Cl. ...................................... 29/610.1; 29/832
[58] Field of Search ............ 156/662; 29/610.1, 621.1, 29/621, 620, 612, 832

[56] References Cited

U.S. PATENT DOCUMENTS

| | | | |
|---|---|---|---|
| 3,767,494 | 10/1973 | Muraoka et al. | 156/17 |
| 4,091,169 | 5/1978 | Bohg et al. | 428/428 |
| 4,227,975 | 10/1980 | Hartman et al. | 204/15 |
| 4,239,559 | 12/1980 | Ito | 148/188 |
| 4,256,532 | 3/1981 | Magdo et al. | 156/628 |
| 4,348,546 | 9/1982 | Little | 136/256 |
| 4,372,803 | 2/1983 | Gigante | 156/626 |
| 4,420,872 | 12/1983 | de Zaldivar | 29/571 |
| 4,472,239 | 9/1984 | Johnson et al. | 156/647 |
| 4,478,076 | 10/1984 | Bohrer | 73/204 |
| 4,478,077 | 10/1984 | Bohrer et al. | 73/204 |
| 4,501,144 | 2/1985 | Higashi et al. | 73/204 |
| 4,542,650 | 9/1985 | Renken et al. | 73/204 |
| 4,548,078 | 10/1985 | Bohrer et al. | 73/204 |
| 4,594,889 | 7/1986 | McCarthy | 73/204 |
| 4,614,119 | 9/1986 | Zavracky et al. | 73/204 |
| 4,624,137 | 11/1986 | Johnson et al. | 73/204 |
| 4,624,138 | 11/1986 | Ono et al. | 73/204 |
| 4,651,564 | 3/1987 | Johnson et al. | 73/204 |
| 4,672,354 | -6/1987 | Kurtz et al. | 29/25.35 |
| 4,680,963 | 7/1987 | Tabata et al. | 73/204 |
| 4,682,503 | 7/1987 | Higashi et al. | 73/255 |
| 4,683,159 | 7/1987 | Bohrer et al. | 428/138 |
| 4,685,331 | 8/1987 | Renken et al. | 73/204 |

FOREIGN PATENT DOCUMENTS 59-65216 4/1984 Japan .

OTHER PUBLICATIONS

SAE Technical Paper, "Silicon Micromachining Technology for Automotive Applications", K. W. Lee and B. E. Walker.

*Primary Examiner*—Donald O. Woodiel
*Attorney, Agent, or Firm*—Russel C. Wells

[57] ABSTRACT

A silicon-based sensor includes a substrate, a sensor element, and a protective diaphragm mounting and covering the sensor element. The diaphragm is a silicon layer which, in a preferred embodiment, includes an etch-stop dopant. The etch-stop layer is sealed to the substrate so that the layer covers and mounts the sensor element to the substrate. The sensor is fabricated by forming a trough area in a surface of a silicon block (e.g., a silicon chip or wafer), treating the trough area with an etch-stop dopant (e.g., boron), depositing a sensor element onto the doped trough area, sealing at least the periphery of the doped trough area to a surface of a substrate (e.g., glass) so as to encapsulate the sensor element, and then etching away undoped regions of the silicon block so that the doped trough area remains as a protective diaphragm sealed to the substrate and covering the sensor element. It is also possible to form a bonding pad on untreated (e.g., undoped) discontinuous regions of an otherwise etch-stop treated trough layer so that when etched, the bonding pad is exposed to permit interconnection with electronic circuitry, yet the etch-stop treated layer remains so as to mount the bonding pad to the substrate.

9 Claims, 2 Drawing Sheets

METHODS OF MAKING SILICON-BASED SENSORS

RELATED APPLICATIONS

This application is related to commonly-owned and copending U.S. application Ser. No. 07/137,299 entitled "Silicon Based Mass Airflow Sensor and its Fabrication Method", filed Dec. 23, 1987 in the name of Ki Won Lee et al.; and Ser. No. 07/137,220 entitled "Control and Detection Circuitry for Mass Flow Sensors", filed Dec. 23, 1987 in the name of Ki Won Lee et al.; the entire contents of each of these commonly-owned and copending U.S. Applications being expressly incorporated hereinto by reference.

FIELD OF THE INVENTION

This invention relates to the field of silicon-based sensors. It includes an especially designed sensor "package" (i.e., a self-contained structure having sensing element(s) and bonding pad(s) (to permit interconnection to electronic circuitry) whereby the sensor element is protected by means of a "diaphragm" consisting essentially of a silicon layer which includes an etch-stop dopant. This same doped silicon layer may also be provided, according to the invention, with discontinuities so that the bonding pad(s) may be exposed for interconnection with suitable control circuitry. That is, the discontinuities in the doped silicon layer permit, during fabrication, "back etching" of the undoped silicon regions of the discontinuities thereby exposing the previously formed metallic bonding pad(s). The sensor is preferably hermetically sealed to a substrate having thermal properties similar to silicon (e.g., glass) so as to provide a stable and durable sensor useful in automotive control applications.

BACKGROUND AND SUMMARY OF THE INVENTION

Most of today's automobiles are equipped with closed-loop, electronic controls supported by on-board microcomputers so as to perform a variety of control functions. Thus, for example, electronic controls are provided to optimize fuel economy and engine operation, meet emission control requirements and to provide for more comfortable and/or safe driving characteristics for the automobile (e.g., such as those characteristics provided by antilocking and/or antiskid braking systems, positive traction systems, suspension adjustment systems and the like).

All of these automotive control systems are dependant upon the ability of the electronic control loop to sense accurately the operating variable(s) of the automobile system under control, and then to exhibit the desired rate-responsiveness in order to exercise adequate control. As more sophisticated electronic control schemes have evolved, it is the sensors which have become performance limiting factors due principally to the inability of sensor fabrication technology to keep pace with the development of integrated automobile control systems.

Recently, however, "micromachining" techniques for forming structural three-dimensional devices from silicon have emerged as a cost-effective means of producing high quality (i.e., sufficiently sensitive) durable sensors useful for the automotive industry. (See, Lee et al, "Silicon Micromachining Technology for Automotive Applications", SAE Publication No. SP655, February, 1986, the entire content of which is expressly incorporated hereinto by reference.)

By way of the present invention, novel micromachining techniques are employed to fabricate equally novel forms of sensors useful in closed loop, electronic controls for automobiles.

According to the invention, silicon-based sensors and methods of sensor fabrication employing silicon micromachining techniques are provided. The sensors of the invention generally include a substrate, a sensor element, and a protective diaphragm mounting and covering the sensor element to the substrate. The diaphragm encompasses, and therefore protects, the sensor from its environment. The protective diaphragm of this invention is one which is formed of an etch-stop doped silicon layer sealed to the substrate.

During fabrication, the etch-stop doped layer is formed on the surface of a recessed "trough" in a block of silicon (which silicon block may be a chip or wafer of the type conventionally used in integrated circuit fabrication technology). The sensor element is then formed over the etch-stop doped layer in the trough (as by removing unnecessary regions of a previously applied metallized layer), and the doped layer is then sealed to the surface of a substrate (e.g., preferably a glass substrate having similar thermal expansion properties to that of silicon). The sensor element is thus "sandwiched" between the doped layer and the substrate. The sensor element is preferably spaced from the substrate particularly if this invention is embodied in the form of a mass air flow sensor.

Undoped regions of the silicon block may then be etched away leaving the etch-stop doped layer as a protective diaphragm covering and mounting the sensor element to the substrate. That is, if the substrate to which the doped silicon layer is sealed is considered to be the front of the sensor, then the etching of undoped silicon regions is accomplished from the back of the sensor (i.e., "back etching"). In this manner, the sensor element is encapsulated by means of the substrate and its protective etch-stop doped silicon diaphragm.

The general techniques described above may also be employed to expose a metallized bonding pad(s) or the like so as to facilitate sensor interconnection with electronic circuitry of the control loop in which the sensor is employed. That is, by discontinuously doping a region of a recessed trough in the silicon block with an etch-stop dopant—that is, so that an undoped region of the trough exists ( between, and/or is defined by, the remaining doped trough region(s)—and then forming the bonding pad(s) over such discontinuously doped region(s) in the trough, the bonding pad may be exposed by back-etching away the undoped silicon region(s) in the trough.

This back etching technique of the invention is thus beneficial in that the sensor element may be formed in one area of a trough in a silicon block (in which the trough surface has been continuously doped with an etch-stop dopant) while a bonding pad may be formed in another area in the same (or different) trough in the silicon block (in which the trough surface has been discontinuously doped with an etch-stop dopant). Upon etching away the undoped silicon regions in the block, therefore, the protective diaphragm (which is comprised of an etch-stop doped silicon layer) covers and mounts the sensor element to the encapsulating substrate while a "window" in the etch-stop doped layer is simultaneously formed exposing the bonding pad(s).

These as well as other objects and advantages of this invention will become more clear to the reader after careful consideration is given to the detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various figures denote like structural elements, and wherein;

FIG. 1 is a front plan view of an exemplary sensor in accordance with the present invention;

FIG. 2 is a cross-sectional elevational view of the exemplary sensor shown in FIG. 1 taken along line 2—2 therein; and FIGS. 3a through 3e, inclusive, schematically show preferred processing steps employed to fabricate the sensors of this invention, FIG. 3e being specifically a cross-section of the sensor shown in FIG. 1 and taken along line 3e—3e therein.

DETAILED DESCRIPTION OF THE PREFERRED EXEMPLARY EMBODIMENT

Figure 1:
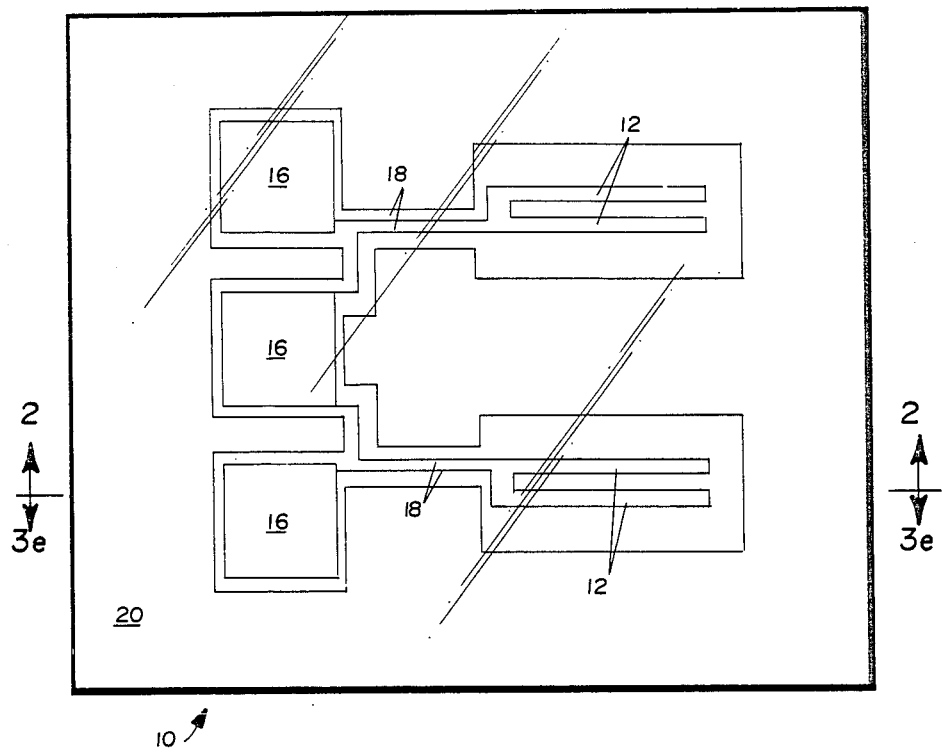
Figure 2:
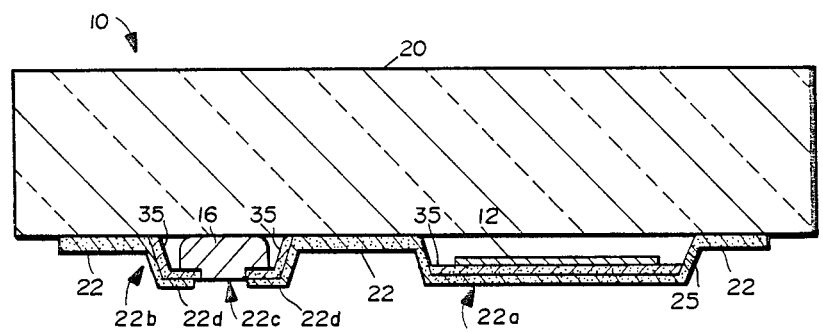

Accompanying FIGS. 1 and 2 show an exemplary sensor 10 of the present invention in a greatly enlarged view for clarity of presentation. Sensor 10 shown in the accompanying figures just happens to be in the form of a mass air flow sensor whereby the sensor elements 12 are, in essence, electrically resistive heater elements so that the mass flow of a fluid stream (e.g., intake air to an internal combustion engine) can be determined by sensing alterations of the heat transfer characteristics of the elements 12. That is, as the mass flow of a fluid stream (e.g., intake air) varies, a corresponding variance of the heat transfer characteristics of elements 12 will occur, and it is this heat transfer variance which may be detected by suitable control circuitry and converted to mass flow data representative of the fluid stream being sensed. This mass flow data may then, in turn, be processed by an on-board (or external) microcomputer so as to adjust, for example, the air/fuel ratio supplied to the engine.

The invention is however equally applicable to any structural form of silicon-based sensors where the protective functions of the diaphragm are desired such as, thin diaphragm, bridge or cantilever-type structures. The selection of any structural type of silicon based sensor is dependent, of course, upon the particular parameter being sensed and hence, the present invention may be embodied in the form of silicon-based sensors useful to sense e.g., pressure force, mass flow, acceleration and/or torque, to name a few.

Sensor 10 generally includes sensor elements 12 interconnected to bonding pads 16 via electrically-conductive interconnect lines 18. Although the conductive traces 12 and 18 are schematically shown as mere lines in FIG. 1, it will be understood that they are typically metallizations of predetermined thickness and depth in cross-section. The sensor 10 includes a substrate 20 (preferably comprised of a material having similar thermal expansion characteristics as compared to silicon) electrostatically sealed to doped silicon layer 22 (to be described in greater detail below). One such material suitable for substrate 20 is borosilicate glass, with Corning 7740 glass being particularly preferred. Substrate 20 may also be composed of a block of silicon having a suitable glass interlayer electrostatically bonded to both the silicon block of substrate 20 and the doped silicon layer 22.

As seen particularly with reference to FIG. 2, layer 22 includes a region 22a which is spaced from substrate 20 yet continuously covers sensor element 12 (only one of the sensor elements 12 is visible in FIG. 2). Thus, since sensor element 12 is on the interior of layer region 22a, the element 12 will likewise be spaced from substrate 20. In such a manner, layer 22 via its region 22a covers and mounts sensor element 12 to substrate 20 so that substrate 20/region 22a encapsulate sensor element 12 thereby protecting the same from the environment in which sensor 10 is used.

As mentioned previously, the doped layer 22 is electrostatically sealed to substrate 20. This permits the interior space of diaphragm region 22a (i.e., that space between sensor element 12 and substrate 20) to be evacuated so as to improve the overall thermal response characteristic for the sensor 10. However, in some applications (for example, when the sensor of this invention is embodied to sense pressures and/or forces) it may be necessary for the interior space of diaphragm region 22a to be at a pressure substantially equivalent to the pressure environment in which the sensor is located. Such pressure equalization may be conveniently provided by means of a port (noted in FIG. 2 as reference numeral 25) which communicates the interior of diaphragm region 22a with its exterior environment. The provision of port 25 is also beneficial with large size mass flow sensors of the type shown in the accompanying figures since pressure equalization obtained thereby will ensure that the diaphragm region 22a will not be structurally damaged due to a pressure difference between its interior and its exterior environment.

Layer 22 may also include another region 22b in the vicinity of bonding pad 16. However, region 22b is discontinuous in that an open region 22c is defined so as to provide a "window" to permit sensor 10 to be electrically interconnected to control circuitry (not shown) via bonding pad 16. Region 22b nonetheless continuously bounds pad 16 about its periphery so as to, in effect, form a rim 22d which mounts pad 16 to substrate 20.

A dielectric layer 35 of e.g., silicon dioxide or silicon nitride is formed on the interior of regions 22a and 22b (as described later) so as to provide structural reinforcement and thus increase the mechanical strength of regions 22a and 22b.

The fabrication steps utilized to form the sensor 10 according to the present invention are schematically shown in accompanying FIGS. 3a–3e, inclusive.

Figure 3A:
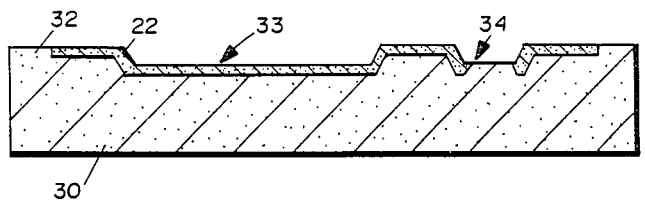

To fabricate sensors 10 of this invention, a surface 32 of a silicon block 30 (which may be in either chip or wafer form) is first etched by any suitable technique so as to form one or more recessed troughs (shown generally by reference numerals 33, 34 in FIG. 3a). The desired depth of recess 33, 34 determines to a large extent the appropriate etching technique employed. That is, if the depth of recesses 33 and/or 34 is less than about 5 to 10 μm, etching is preferably accomplished (after the recess trough pattern has been formed according to well known photolithographic techniques) using a plasma etch (i.e., a dry etch). If however, the depth of recesses 33 and/or 34 is greater than about 10 μm, chemical etching techniques are preferred.

A suitable etch-stop dopant (e.g., boron) is then diffused into surface 32 of block 30 including troughs 33, 34 formed therein (FIG. 3a) so as to form the etch-stop doped silicon layer 22. The precise boundaries of the continuously doped surface region of trough 33 and the discontinuously doped surface region (i.e. so as to form discontinuous region 22c) of trough 34 may be obtained by use of photolithographic patterning techniques well known in the art. Layer 22 (which consists essentially of silicon and the etch-stop dopant) is thereby formed on surface 32 and thus also on the surfaces of troughs 33, 34.

Since layer 22 also serves as an etch-stop layer, it is necessary for the dopant to be diffused into layer 22 in a sufficiently high density. For example, when boron is used as the dopant, it is preferred that its doping density be about $5 \times 10^{19}$ atoms/cm$^2$. The depth to which the dopant is diffused (i.e., the depth of layer 22) is dependent upon the final size of sensor 10. The layer 22 of most sensors embodying the present invention will have a depth of between about 1 μm to about 10 μm, with the greater layer thickness being associated with sensors 10 of a greater physical size and vice versa. For example, the exemplary sensor 10 shown in FIGS. 1 and 2 is about 3 mm $\times$ 3 mm and the depth of layer 22 is about 2 μm.

Figure 3B:
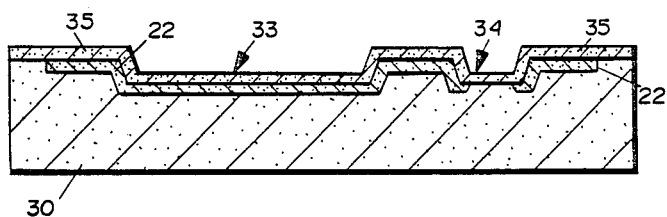

Silicon dioxide or silicon nitride as a dielectric layer 35 is then deposited over doped surface 32 including the doped surfaces of troughs 33 and 34 of the silicon block 30 as is shown in FIG. 3b. Dielectric layer 35 serves as a "mask" during metallization procedures to form bonding pad(s) 16 and sensor elements 12 and, in the final form of sensor 10, provides structural support for the diaphragm region 22a (see FIG. 2).

Figure 3C:
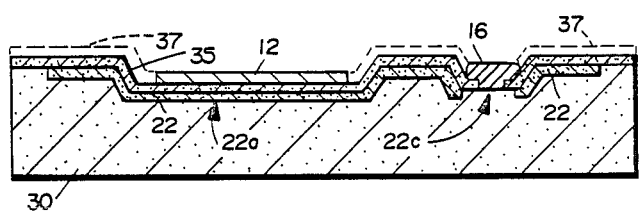

Plating and metallization of bonding pad(s) 16 and sensor elements 12 then occurs as is depicted schematically in FIG. 3c. In this processing step, the dielectric layer 35 in the vicinity of region 22c in trough 34 must first be selectively removed as may be accomplished conveniently by photolithographically patterning region 22c on layer 35 and then selectively etching away the same. A metallized layer (shown in dashed line by numeral 37 in FIG. 3c) is then formed over the dielectric layer 35 by evaporating a metal (e.g., nickel or gold) having the desired resistive and thermal properties. Bonding pad(s) may then be formed over region 22c of trough 34 via electrochemical plating. Preferably, the plating process is continued until the thickness of pad 16 is sufficient so that it contacts substrate 20 (see FIG. 3d). In this regard, it may be seen in FIG. 3c that pad 16 is of sufficient thickness so that its top (i.e., in an orientation as viewed in FIG. 3c) is substantially coplanar with layer 22 after removal of layer 35.

With bonding pad 16 formed in trough 34, portions of the metallized layer 37 not forming the sensor element 12 may then be removed by selective chemical etching. This can be conveniently practiced by photolithographically patterning sensor element 12 on layer 37 and then removing unwanted portions of layer 37.

Figure 3D:
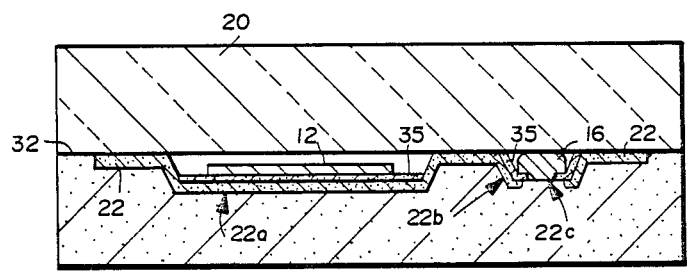
Figure 3E:
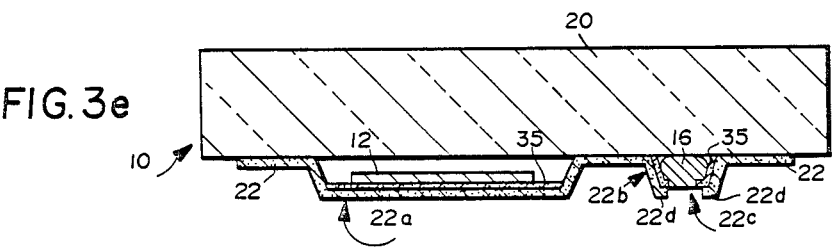

FIG. 3d shows the next step in sensor fabrication of this invention wherein a substrate 20 of e.g., glass (more preferably borosilicate glass) is electrostatically bonded and sealed to surface 32 of silicon block 30. Electrostatic sealing is practiced by applying an electric field between the substrate 20 and the silicon block 30 at an elevated temperature (e.g., about 450° C.) thereby forming an intimate hermetic seal therebetween. Prior to electrostatic sealing, however, the dielectric layer portions overlying surface 32 of block 30 and that portion of doped layer 22 associated with surface 32 must first be removed via chemical etching techniques.

Finally, undoped regions of silicon block 30 may be etched away thereby leaving only the etch-stop doped layer 22 as a protective diaphragm covering and mounting sensor element 12 to substrate 20. Similarly, layer 22 also mounts bonding pad(s) 16 to substrate 20. That is, the remaining discontinuous layer 22 in the vicinity of bonding pad(s) 16 nonetheless bounds the same and creates a mounting rim 22d which serves to mount pad(s) 16 to substrate 20. However, since discontinuous undoped region 22c of trough 34 has been removed together with the undoped silicon regions of block 30, a "window" exposing bonding pad(s) 16 is thus created simultaneously with the removal of the undoped silicon of block 30. Moreover, it should be noted that this exposure of bonding pad(s) 16 occurs simultaneously with the etching away of undoped silicon block 30.

Although reference has been made to layer 22 (and the resulting diaphragm) being an "etch-stop doped layer" of silicon, it should be understood that such a reference is to a particularly preferred embodiment of this invention and is nonlimiting. Thus, the present invention may employ any suitable fabrication technique and/or material so as to form layer 22 (and the resulting diaphragm) which is resistive to subsequent etching and/or removal of unwanted silicon portions of the block 30. And it is also conceivable that etching or any other silicon removal technology could be utilized without forming layer 22 integral with the silicon block 30 so long as the formed layer is resistive to subsequent removal of unwanted silicon portions of block 30 and is structurally suitable for its intended functions as described above. Suffice it to say that the sensor designer may select any fabrication expedient to form functional and structural equivalents of the layer 22 (and the resulting diaphragm) in accordance with the principles of this invention.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of fabricating a sensor comprising the steps of:
   (a) forming a trough area in a surface of a silicon block;
   (b) forming an etch-stop layer in the trough area;
   (c) depositing a sensor element onto said trough area;
   (d) sealing at least the periphery of said trough area to a surface of a substrate to thereby encapsulate said sensor element; and
   (e) selectively etching away regions of said silicon block so that said etch-stop layer remains as a protective diaphragm sealed to said substrate and covering said sensor element.

2. A method as in claim 1, wherein step (d) is practiced by electrostatically sealing at least the periphery of said trough area to a glass substrate.

3. A method as in claim 1, wherein step (a) is practiced so as to form another trough area in said silicon block, and step (b) is practiced by discontinuously etch-stop treating said another trough area so as to define an untreated region therein; and wherein said method further includes forming a bonding pad over said untreated region in said another trough area so that when step (e) is practiced, said bonding pad will be exposed through said discontinuous doped layer of said another trough area by virtue of said untreated region thereof being etched away.

4. A method as in claim 1 wherein step (b) is practiced using an etch-stop dopant.

5. A method of fabricating a sensor comprising the steps of:
  (a) forming a trough area in a surface of a silicon substrate;
  (b) discontinuously doping the trough area with an etch-stop dopant to form a doped layer thereon having at least one undoped region;
  (c) depositing a metallic layer over said at least one undoped region;
  (d) etching away undoped silicon of said substrate, including said at least one undoped region so that said doped layer of said trough area remains and so that said metallic layer is exposed.

6. A method as in claim 5, further comprising the step of sealing at least a periphery of said doped trough area layer to a surface of a second substrate.

7. A method as in claim 5, wherein said second substrate is glass.

8. A method of making a sensor of the type having a sensor element and a metallic bonding pad adapted to permit interconnection between said sensor element and electronic circuitry, said method comprising the steps of:
  (a) forming respective trough areas in a silicon substrate for said sensor element and said bonding pad;
  (b) doping said respective trough areas with an etch-stop dopant so that at least that one of said trough areas includes at least one undoped region;
  (c) forming said bonding pad and said sensor element in said one and the other said trough areas, respectively; and
  (d) etching away undoped regions of said silicon substrate, including said at least one undoped region of said one trough area, so that said doped trough areas remain and so that said bonding pad is exposed.

9. A method as in claim 8, further comprising the step of sealing at least a periphery of said doped trough area layer to a surface of a second substrate.

* * * * *